United States Patent [19]

McCollum et al.

[11] Patent Number: 4,631,472
[45] Date of Patent: Dec. 23, 1986

[54] ISOLATED LOW POWER THYRISTOR GATE DRIVE CIRCUIT

[75] Inventors: Patrick E. McCollum, Yorba Linda; James K. Brownrigg, Brea; Carl O. Linder, La Habra Heights, all of Calif.

[73] Assignee: Rockwell International Corporation, El Segundo, Calif.

[21] Appl. No.: 740,465

[22] Filed: Jun. 3, 1985

[51] Int. Cl.$^4$ .............................................. H02J 3/12
[52] U.S. Cl. ................................. 323/325; 307/252 Q
[58] Field of Search .............. 323/225, 237, 239, 320, 323/324, 325; 307/252 B, 252 Q, 270; 363/54, 57, 96, 136

[56] References Cited

U.S. PATENT DOCUMENTS 4,174,496 11/1979 McFall et al. ...................... 323/235
4,445,183 4/1984 McCollum ............................. 361/3

Primary Examiner—Peter S. Wong
Assistant Examiner—Judson H. Jones
Attorney, Agent, or Firm—H. Fredrick Hamann; James F. Kirk

[57] ABSTRACT

An isolated low power thyristor gate drive circuit for driving the gate of a thyristor having an anode and a cathode. The drive circuit is responsive to a signal voltage from a signal source. The signal voltage is sourced with respect to a first reference potential to the low power gate drive circuit. The invention circuit has a dual polarity source (DPS) responsive to the signal source for providing a positive drive signal having a positive polarity with respect to a second reference potential and a negative drive signal having a negative polarity with respect to the second reference potential. A normally open semiconductor device network has a current sink terminal, a current source terminal, and a gate terminal. A normally conducting semiconductor device has a current sink terminal, a current source, and a control terminal.

The normally open semiconductor device network current sink terminal is coupled to the thyristor anode. The normally open semiconductor device network gate is coupled to receive the dual polarity source positive drive signal. The normally conducting semiconductor device current sink terminal is coupled to the second reference potential, the thyristor gate and to the normally open semiconductor device network current source terminal. The normally conducting semiconductor device current source terminal is coupled to the thyristor cathode.

10 Claims, 4 Drawing Figures

ISOLATED LOW POWER THYRISTOR GATE DRIVE CIRCUIT

BACKGROUND OF THE INVENTION

1. Field of the Invention

This invention relates to the field of ac POWER CONTROL and in particular to the field of thyristor drive circuits.

2. Prior Art

A thyristor-drive circuit is shown in FIG. 5 of U.S. Pat. No. 4,174,496, issued Nov. 13, 1979 and titled MONOLITHIC SOLID STATE POWER CONTROLLER, assigned to the common assignee. This circuit is relevant for its use of junction field effect transistors coupled between the respective gates and cathodes of anti-parallel silicon controlled rectifiers (SCRs) and the use of an isolation transformer. It does not show the use of an N-channel insulated gate field effect transistors, and a blocking diodes coupled in series between the respective anodes and gates of the SCRs. A variety of triggering circuits are characterized in texts such as the "GE Transistor Manual", published by General Electric in 1964. A number of manufacturers' application literature publications are available on the subject of SCR and thyristor power control circuits directly from manufacturers such as Motorola, P.O. Box 20924, Phoenix, Ariz. 85036, the RCA Company at Summerville, N.J., and TECCOR INC at P.O. Box 61447, Dallas, Tex. 75261.

The thyristor drive circuits taught by the above references are typically concerned with the thyristor control of circuits powered from a 60 Hz voltage source. Drive circuits of conventional design typically consume power from a low voltage dc voltage source such as a 5 or 10 V. power supply. Many applications, requiring the use of large numbers of thyristors drive circuits do not have a low voltage auxiliary power source available. Thyristor drive circuits typically require the use of an auxiliary low voltage source comprising a step-down isolation transformer and a rectifier filter power supply to generate the auxiliary low voltage source to power the thyristor drive circuit. A low voltage power source of this type has weight, volume and cost not present in the invention circuit.

SUMMARY OF THE INVENTION

It is an object of the invention isolated low power thyristor drive circuit to provide gate drive signals to a thyristor switch such as a silicon-controlled rectifier (SCR) used to switch power from an ac voltage source such as a 230 V. ac, 60 or 400 Hz source to a load, such as a resistive lamp load, a capacitive load or an inductive load such as a motor.

It is a further objective of the invention to provide a terminating current path from the gate of the driven thyristor to its cathode with a relatively small power expenditure by the invention gate drive circuit.

It is another object of the invention circuit to provide isolation between the signal source used to command the thyristor drive circuit on and the thyristor drive circuit.

The invention circuit comprises a dual polarity source driven by a high frequency pulse source such as a small pulse transformer to provide a dual polarity voltage source. The dual polarity voltage source provides a control signal to the gate of a normally open semiconductor device network. The network consists of an N-channel enhancement mode, field effect transistor having a conduction channel and a gate coupled to the control signal source. The conduction channel of the field effect device is connected in series with a blocking diode and a current limiting resistor between the anode of the thyristor to be driven and the thyristor gate. A normally conducting semiconductor device, such as an N-channel J-FET is coupled between the gate of the thyristor and its respective cathode. The gate of the normally conducting semiconductor device (the N-CHANNEL J-FET) is coupled to the second signal voltage source. The normally conducting N-channel semiconductor device provides a low resistance path from the gate of the thyristor to its cathode; thereby, providing a discharge path for the gate. This path operates to provide a continuous leakage path for current leaving the gate to pass to the cathode of the thyristor device. This path is available without current or signal being applied to the invention drive circuit and operates to increase the immunity of the circuit to undesirable, noise-generated turn on of the thyristor that can occur when a fast rising voltage is applied to the anode with respect to the cathode.

PREFERRED EMBODIMENT

Figure 1:
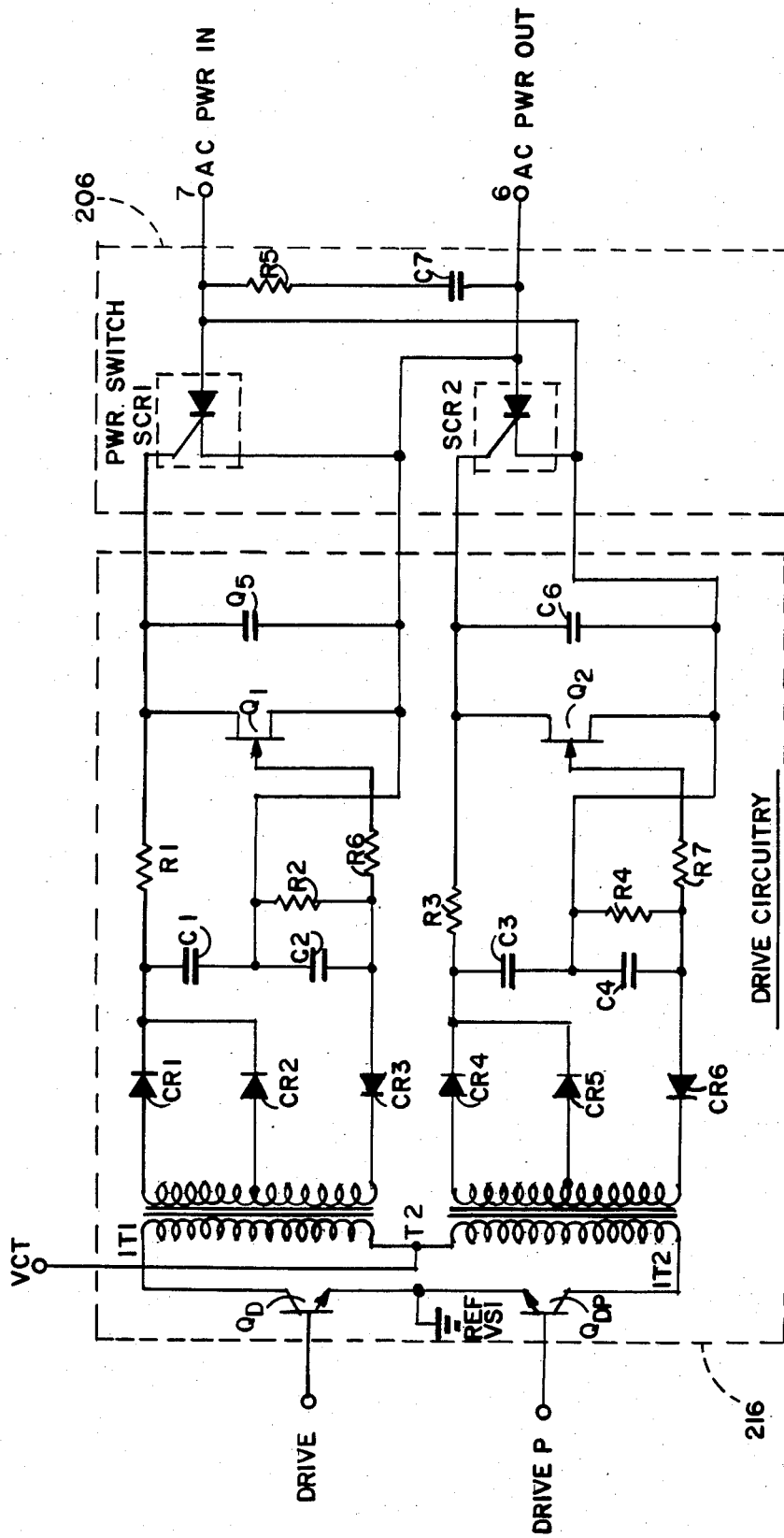
FIG. 1 is a schematic of a prior art thyristor gate drive circuit.

FIG. 1 represents a PRIOR ART thyristor gate drive circuit shown in FIG. 5 of U.S. Pat. No. 4,174,496 issued Nov. 13, 1979, assigned to the common assignee. The named inventor is named as a co-inventor in this prior art reference. The prior art thyristor gate drive circuit is of interest because it shows the use of an isolation transformer and a J-FET coupled between the gate and cathode of each respective SCR. The earlier circuit is designed for use with sensitive gate SCRs. The energy delivered to the gate of the SCR is obtained from the VCT source via switching signals DRIVE and DRIVE P operating switches QD and QDP at zero-crossing time on alternate half-cycles of the power source applied to terminal 7. The isolation transformer provides isolation and couples power from the VCT source to create positive and negative sources at the cathodes of CR1, CR4 and anodes of CR3 and CR6, respectively.

Large geometry SCRs capable of switching large currents require a gate drive current in excess of the SCR device required latching current for a time interval sufficient to guarantee latching on each successive cycle. The total power required by the circuit of FIG. 1 is processed through the isolation transformer from the low voltage VCT source. The present invention isolated gate drive circuit allows the use of non-sensitive gate SCRs without reflecting a substantial power demand to the systems low-voltage source by deriving power from the voltage source driving the load through the SCR.

Figure 2:
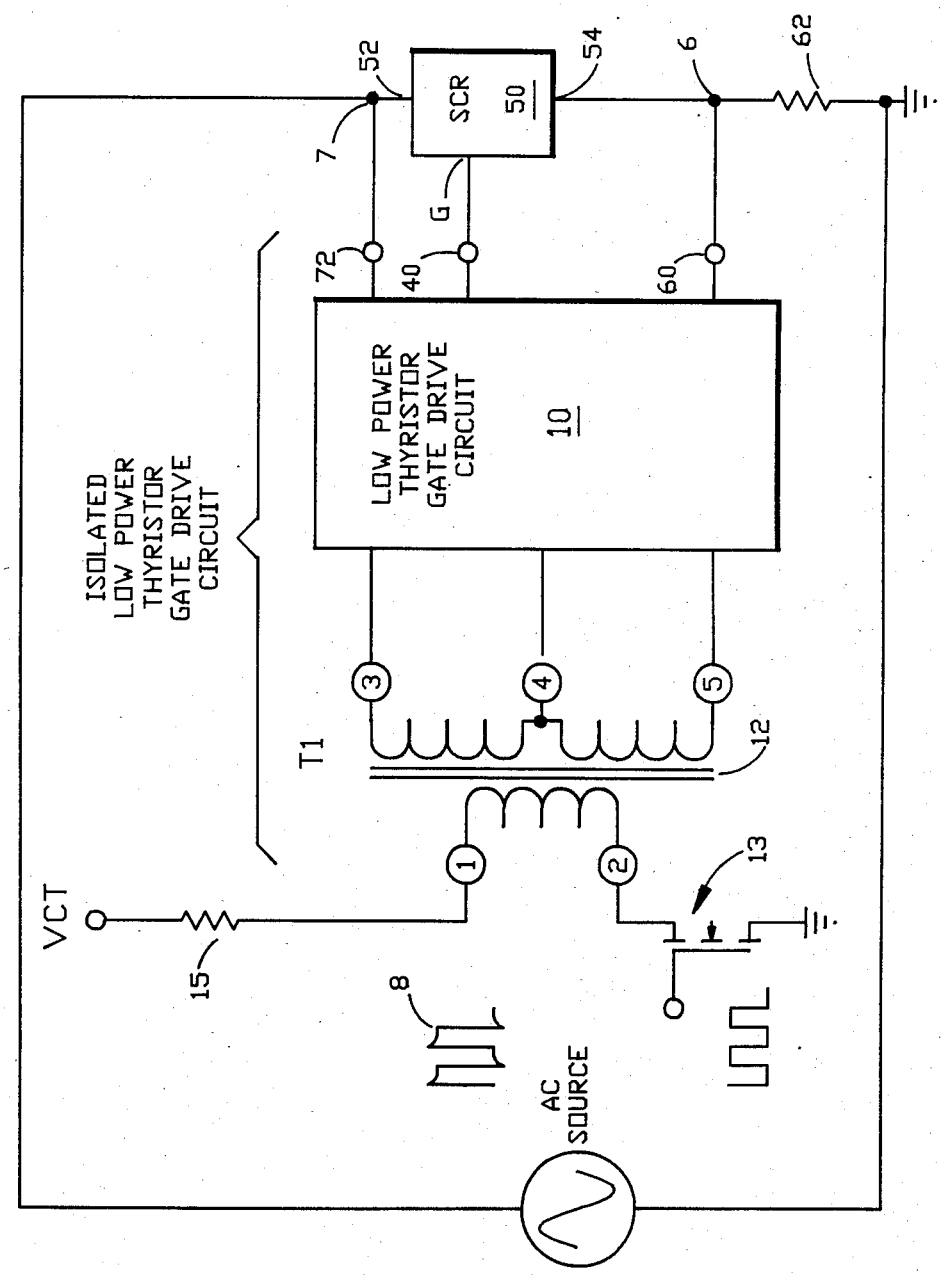
FIG. 2 is a partial schematic, partial block diagram of a single invention gate drive circuit.

FIG. 2 depicts the isolated low power thyristor gate drive circuit as the combination of block 10 and transformer T1, T2. The drive circuit drives the gate 40 of a thyristor, such as SCR 50 having anode 52 and a cathode 54. Anode 32 represents a power input terminal equivalent in function to AC PWR IN terminal 7 in FIG. 1. Cathode 54 is equivalent to the AC PWR OUT terminal 6 of FIG. 1.

The drive circuit of FIG. 2 is responsive to a signal voltage represented by wave shape 8 from a signal source, such as the switching circuit comprised of FET 13, resistor 15 and low voltage source VCT, the FET 13 being switched on and off at a 250 KHz rate with a duty rate of approximately fifty percent. The signal voltage is sourced to the primary of transformer T1, pin 1 as a positive drive signal having a positive polarity with respect to a first reference potential, such as ground coupled to the transformer T1, primary at pin 2. A negative drive signal would provide a functionally equivalent drive if the polarity of either the primary or secondary is reversed.

Figure 3:
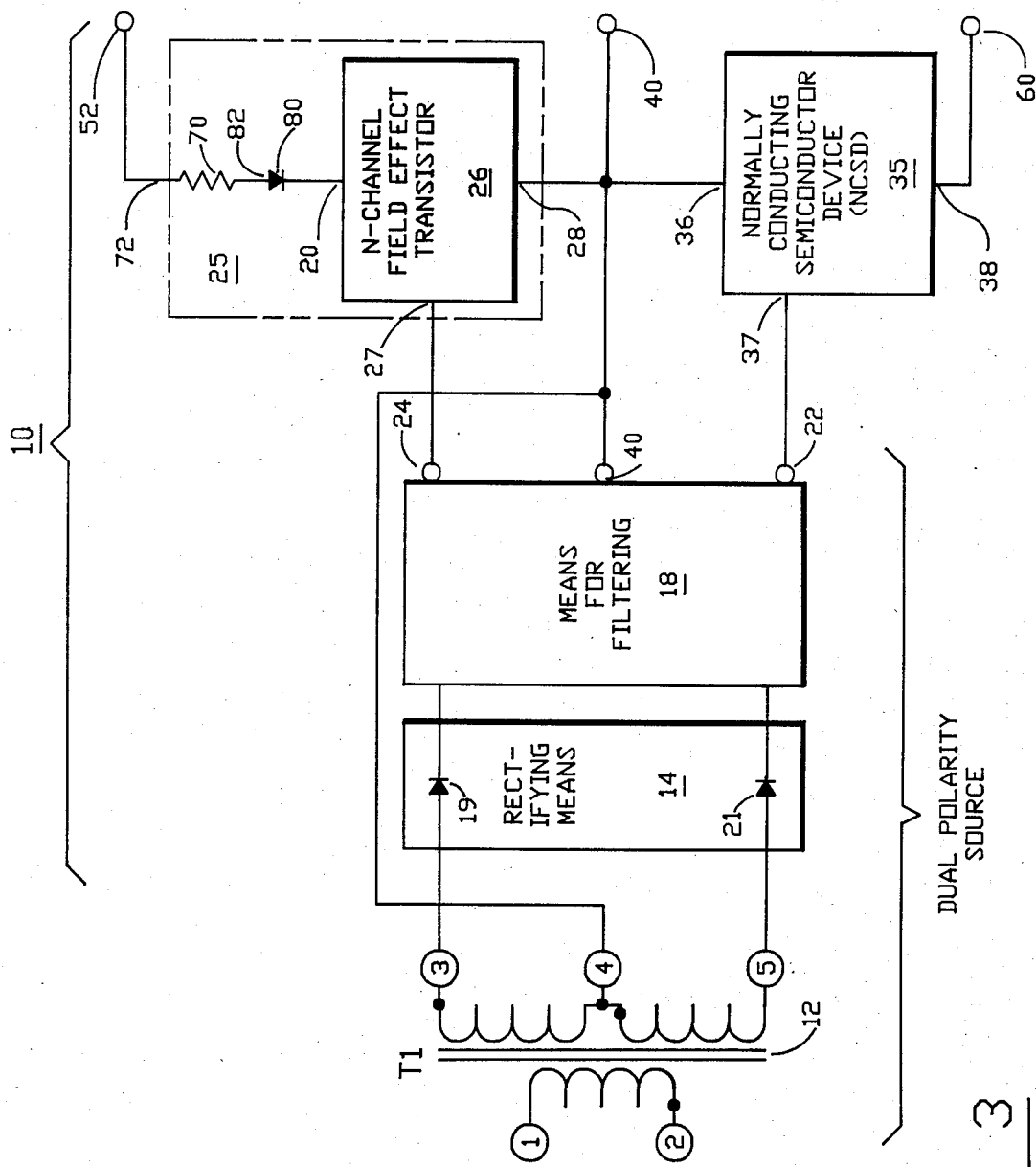
FIG. 3 is a partial schematic, partial block diagram of the invention gate drive circuit.

Referring to FIG. 3, the circuitry beneath bracket 10 characterizes an embodiment of circuitry within block 10 in FIG. 2. Blocks 14 and 18 and transformer T1 cooperate to form a dual polarity source (DPS) responsive to the signal source applied at transformer T1, pin 1. The DPS provides a positive drive signal at node 24 having a positive polarity with respect to a second reference potential, such as the potential at terminal 40.

The transformer T1 is typically phased to operate as a flyback source. The phasing is characterized to back bias diodes 19 and 21 during the interval that FET 13 (shown in FIG. 2) is on. This conduction interval is typically 2 μs. Magnetizing current is allowed to increase in the primary to a limit established by resistor 15, (shown in FIG. 2) in series with the primary and FET 13. FET 13 is then turned off allowing the magnetizing energy stored within the core to reverse the polarity of voltage on both the primary and secondary windings and to discharge the core energy via diodes 19 and 21; thereby, supplying dual polarity sources.

The normally open semiconductor device network (NOSDN) is depicted as phantom block 25 as having a current sink terminal 72, a current source terminal 28, and a gate terminal 27.

Block 35 represents a normally conducting semiconductor device (NCSD), such as an N-channel J-FET, having a current sink terminal 36, a current source terminal 38, and a control terminal 37.

The NOSDN current sink terminal 26 is coupled to the thyristor anode 52 (not shown). The NOSDN gate 27 is coupled to the DPS positive drive signal at terminal 24. The NCSD current source terminal is coupled to the thyristor cathode 60.

The NCSD current sink terminal 36 is coupled to the second reference potential 40 where it is common with the thyristor gate at terminal 40 and common with the NOSCD current source terminal 28.

The dual polarity source comprises an isolation transformer, such as T1, having a primary between terminals 1 and 2 and a secondary between terminals 3, 4 and 5. The primary has a first terminal, pin 1, coupled to the signal source that provides a signal at terminal 1, such as the signal 8 of FIG. 2. The transformers primary second terminal, pin 2, is coupled to a first reference potential such as ground. The secondary of transformer T1 has a first terminal, such as pin 4, coupled to a second reference potential such as gate terminal 40.

The secondary also has at least a second and third terminals represented by pins 3 and 5. Blocks 14 and 18 represent a means for rectifying and filtering the signal voltage coupled from the transformer primary to the transformer secondary second and third terminals 3 and 5. The means for rectifying and filtering provides positive and negative gate drive signals to gates 27 and 37, respectively.

Figure 4:
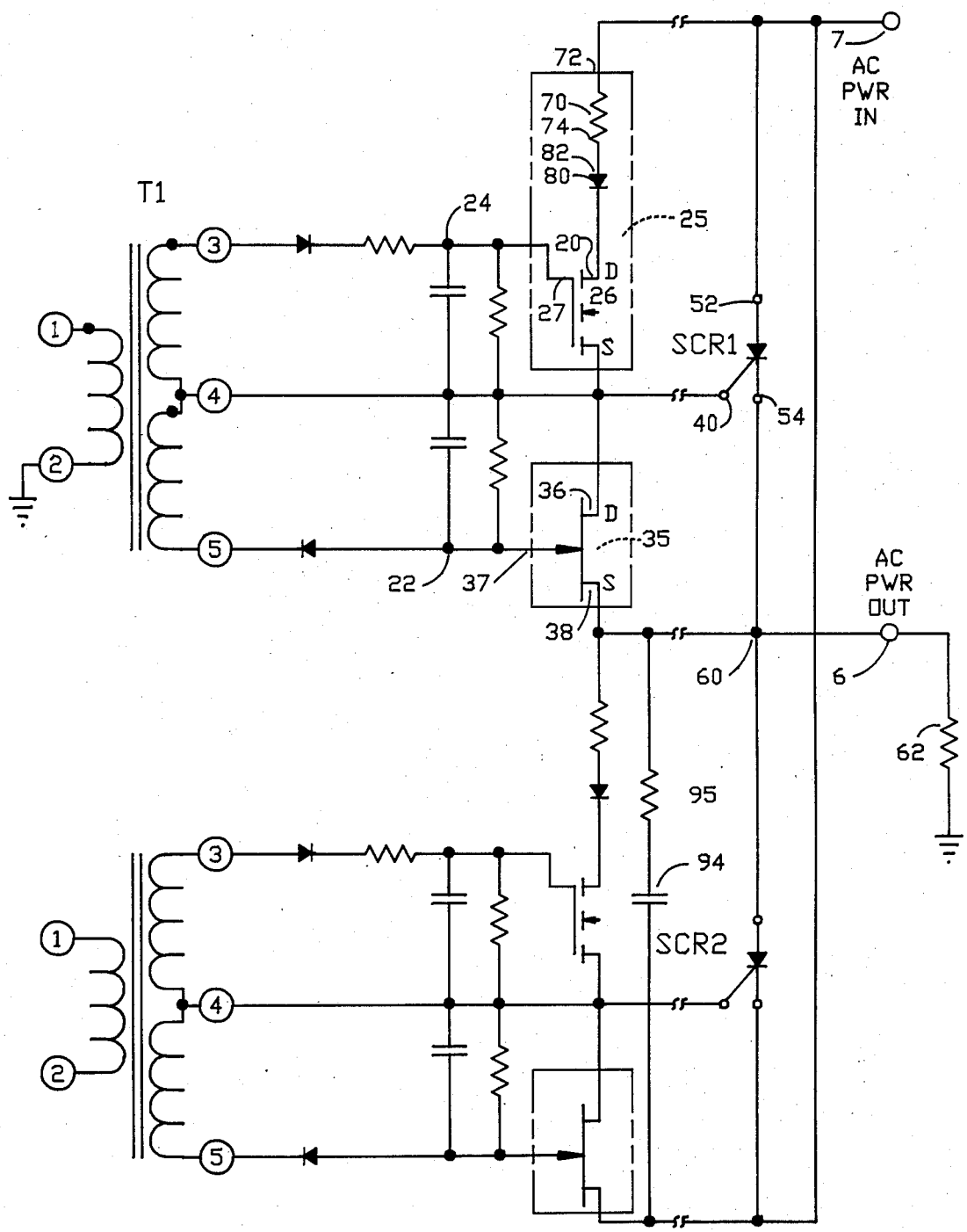
FIG. 4 is a schematic of a pair of isolated low power thyristor gate drive circuits used to drive the respective gates of a pair of anti-parallel SCRs.

Referring to FIG. 4, the normally open semiconductor network depicted as phantom block 25 has an N-channel field effect transistor 26 having a drain terminal 20, a source terminal 28, and a gate terminal 27. The NOS network further comprises the series combination of resistor 70 and blocking diode 80. The resistor first terminal 72 is coupled to the thyristor anode at terminal 52. The resistor second terminal 74 is coupled to the diode anode 82 and the diode cathode is coupled to the N-channel field effect transistor drain 20. The N-channel field effect transistor gate 27 is coupled to the positive drive signal at terminal 24 and the N-channel field effect transistor source 28 is coupled to the second reference potential at thyristor gate terminal 40.

The normally conducting semiconductor device (NCSD) comprises an N-channel junction field effect transistor 35 having a drain 36, a gate 37, and a source 38. The N-channel junction field effect transistor source 36 is coupled to the second reference potential at thyristor gate terminal 40. The gate 37 of the J-FET is coupled to the negative drive signal at terminal 22 and the drain of the J-FET is coupled to the thyristor cathode at terminal 60.

OPERATION

Referring to FIG. 4, the invention circuit commands the thyristor (SCR1) into conduction in response to a switching signal at T1, pin 1. A typical drive circuit might include a pull up resistor (as shown in FIG. 2), from pin 1 a +10 V. supply (not shown) and an NPN transistor (not shown) coupled to switch pin 1 to pin 2. This arrangement would provide a switching signal to the T1 primary in response to the NPN transistor being turned off.

The T1 transformer typically uses in toroidal ferrite core, such as torroid part number R-40601 by Magnetics Inc. of Pennsylvania having an outer diameter of 0.230 in., an inner diameter of 0.120 in., and a height of 0.060 in.

The primary of the transformer has 35 turns of No. 43 AWG wire. The secondary has 70 turns of No. 43 AWG wire between pins 3 and 4 and 70 turns between pins 4 and 5. The transformer is segment wound and vacuum impregnated to increase the dielectric withstanding capability between primary and secondary to a potential established by the application, typically 1300 volts.

As T1, pin 1 is switched to a positive value, T1 couples a positive voltage to pin 3 and a negative voltage to pin 5, each measured with respect to pin 4.

The N-channel J-FET is a normally conducting device. A negative voltage on its gate 37 with respect to its source 38 from filter terminal 22 turns the device off. The voltage difference between the drain and source of the J-FET is limited by the gate 40 to cathode 60 voltage of thyristor SCR1 to no more than a few volts. The negative voltage applied to gate 37 must be scaled to ensure that it reaches a limit sufficiently negative with respect to the source 38 to ensure the turn-off of the J-FET 35.

The N-Channel Insulated Gate FET 26 is typically a Motorola MTN 850. It is a 1A device selected to have a drain to source breakdown voltage of 850 V. This voltage exceeds the positive swing of the power source applied to terminal 7. Conventional practice requires that a FET be selected that has a BVDS voltage rating that exceeds the highest instantaneous positive voltage including transients up to 510 v at node 7 by at least 30 percent.

Diode 80 is tyically a IN 4006, a 1A axial lead device. This diode blocks the reverse swing on node 7; thereby, preventing FET 26 from having to withstand a reverse voltage. The diode 80 is selected to have a current rating in excess of the maximum trigger current anticipated. The peak trigger current is delivered as FET 26 is turned on.

Resistor 70 is typically a 32 OHM, ½ W resistance selected to limit the peak transient amplitude of trigger current to a value determined by the maximum anticipated voltage on node 7, the rated current FET 26, and the rated trigger current of SCR1.

The peak trigger current after SCR1 turns on is limited by the forward drop of SCR1, R70, the Vgc of SCR1 and the channel resistance of FET 26.

The use of FETs 26 and 35 enable a typical drive circuit to function with low input power. A circuit designed to drive a 70 amp SCR sourcing power to a 7 amp load from a 400 Hz, 230 Vac service has been measured to require 15 milliwatts from a low voltage signal source, such as VCT inputting power to the primary of T1. A conventional drive circuit for SCRs of this current capacity would typically require a higher input drive power level.

FIG. 4 shows a pair of invention drive circuits capable of alternately commanding a pair of anti-parallel SCRs, such as shown by SCR1 and SCR2. The SCR1 and SCR2 devices are typically Motorola MCR70 devices having a rating of 70A and a reverse breakdown voltage of 600 V. A small resistance is placed in series with these SCRs for use in current monitoring and for limiting fault current.

The invention drive circuit of FIG. 4 uses resistor 95 and capacitor in series to suppress high frequency transient voltages present on the AC power service to terminal 7.

The arrangement of FIG. 4 permits the drive circuit to control the polarity of the first half power-cycle applied to load 62. This feature is of particular benefit when combined with the control capability of solid state power control circuits, such as that characterized in U.S. Pat. No. 4,445,183, ELECTRICAL SWITCH, issued Apr. 24, 1983, and assigned to the common assignee.

What is claimed is:

1. An isolated low power thyristor gate drive circuit, for driving the gate of a thyristor having an anode and a cathode, the drive circuit being responsive to a signal voltage from a signal source, powered by a low voltage source with respect to a first reference potential, the gate drive circuit comprises:
a dual polarity source (DPS) responsive to said signal source for simultaneously providing a positive drive signal having a positive polarity with respect to a second reference potential and a negative drive signal having a negative polarity with respect to said second reference potential;
a normally open semiconductor device network having:
 a current sink terminal,
 a current source terminal, and
 a gate terminal;
a normally conducting semiconductor device having:
 a current sink terminal,
 a current source terminal, and
 a control terminal;
said normally open semiconductor device network current sink terminal being coupled to said thyristor anode, said normally open semiconductor device network gate being coupled to receive said dual polarity source positive drive signal;
said normally conducting semiconductor device current sink terminal being coupled to said second reference potential, said thyristor gate and to said normally open semiconductor device network current source terminal,
said normally conducting semiconductor device current source control terminal being responsive to said negative drive signal; and
said normally conducting semiconductor device current source terminal being coupled to said thyristor cathode;
said normally conducting semiconductor device providing a relatively low resistance path between said thyristor gate and cathode in the absence of said dual polarity source negative drive signal, and
a substantially open circuit in response to said negative drive signal;
said normally open semiconductor device operating to provide a conduction path between said thyristor anode and said thyristor gate in response to said dual polarity source positive drive signal and an open circuit between said thyristor anode and gate in the absence of said dual polarity source positive drive signal.

2. The isolated low power thyristor gate drive circuit of claim 1 wherein said dual polarity source further comprises:
an isolation transformer having a primary and a secondary,
 said primary having:
  a first terminal and a second terminal, said first and second terminals being coupled to said signal source;
 said secondary having:
  a first terminal coupled to said second reference potential and at least a second and third terminal;
a means for rectifying and filtering the signal voltage coupled from said transformer primary to said transformer secondary second and third terminals and for providing positive and negative gate drive signals.

3. The isolated low power thyristor gate drive circuit of claim 2 wherein said transformer primary and secondary are phased to function as a flyback source in response to said signal source.

4. The isolated low power thyristor gate drive circuit of claim 1 wherein said normally open semiconductor network further comprises:
an N-channel field effect transistor having:
 a drain terminal,
 a source terminal, and
 a gate terminal;
a resistor having a first and second terminal and a diode having an anode and a cathode;
 said resistor first terminal being coupled to said thyristor anode, and
 said resistor second terminal being coupled to said diode anode, said diode cathode being coupled to said N-channel field effect transistor drain, said N-channel field effect transistor gate being coupled to said positive drive signal, and said N-channel field effect transistor source being coupled to said second reference potential.

5. The isolated low power thyristor gate drive circuit of claim 1 wherein said normally conducting semiconductor device further comprises:

an N-channel junction field effect transistor having a drain, a gate, and a source;

said N-channel junction field effect transistor source being coupled to said second reference potential, said gate being coupled to said negative drive signal, and said drain being coupled to said thyristor cathode.

6. The isolated low power thyristor gate drive circuit of claim 2 wherein said means for rectifying and filtering the signal voltage to provide positive and negative gate drive signals further comprises:

a first and second rectifier, each rectifier having a respective anode and cathode terminal;

a first and second filter network, each filter network having a capacitor in parallel with a resistor, said transformer secondary winding first terminal being coupled to said first rectifier anode, said transformer secondary winding second terminal being coupled to said second rectifier cathode, said transformer secondary winding tap being coupled to a second reference potential, said first rectifier cathode being coupled to said first filter network first terminal, said first filter second terminal being coupled to said second reference potential and to said second filter network first terminal, said second rectifier anode being coupled to said second filter second terminal;

said transformer primary and secondary being phased to operate as a flyback power source in response to said drive signal source.

7. An isolated low power thyristor gate drive circuit, for driving the gate of a silicon controlled rectifier having an anode and a cathode, the gate drive circuit being responsive to a signal voltage from a signal source, said signal voltage being sourced with respect to a first reference potential, said gate drive circuit comprising:

a transformer having a primary winding coupled to said signal source and a secondary phased to operate as a flyback power source in response to said signal source and having a single tap, said primary being coupled between said signal source and said first reference potential;

a first and second rectifier, each rectifier having a respective anode and cathode terminal;

a first and second filter network, each filter network having a capacitor in parallel with a resistor, said transformer secondary winding first terminal being coupled to said first rectifier anode, said transformer secondary winding second terminal being coupled to said second rectifier cathode, said transformer secondary winding tap being coupled to a second reference potential, said first rectifier cathode being coupled to said first filter network first terminal, said first filter second terminal being coupled to said second reference potential and to said second filter network first terminal, said second rectifier anode being coupled to said second filter second terminal;

a first blocking diode having an anode and a cathode;

an N-channel insulated gate field effect transistor having a drain, a source, and a gate; and an N-channel junction field effect transistor having a source, a drain, and a gate;

said first filter first terminal being coupled to said N-channel enhancement mode field effect transistor gate, said second filter second terminal being coupled to said N-channel junction field effect transistor gate, said blocking diode anode being coupled to said silicon controlled rectifier anode, said blocking diode cathode being coupled to said N-channel insulated gate field effect transistor drain, said N-channel insulated gate field effect transistor source being coupled to said second reference potential, said silicon controlled rectifier gate, and to said N-channel junction field effect transistor source, said N-channel junction field effect transistor drain being coupled to said silicon controlled rectifier cathode.

8. The isolated low power thyristor gate drive circuit of claim 7 further comprising:

a first current limiting resistor, said first current limiting resistor being interposed between said blocking diode cathode and said N-channel enhancement mode field effect transistor drain.

9. The isolated low power thyristor gate drive circuit of claim 7 further comprising:

a delay resistor, said delay resistor being interposed between said first rectifier cathode and said first filter first terminal.

10. The isolated low power thyristor gate drive circuit of claim 7 wherein a TRIAC is substituted for said silicon controlled rectifier.

* * * * *

UNITED STATES PATENT AND TRADEMARK OFFICE
CERTIFICATE OF CORRECTION

PATENT NO. : 4,631,472

DATED : December 23, 1986

INVENTOR(S) : Patrick E. McCollum et al.

It is certified that error appears in the above-identified patent and that said Letters Patent is hereby corrected as shown below:

Column 4, line 38, after "from pin 1" insert -- to --.

Signed and Sealed this

Twenty-eighth Day of April, 1987

Attest:

DONALD J. QUIGG

Attesting Officer

Commissioner of Patents and Trademarks